US009156154B2

(12) United States Patent
Brown et al.

(10) Patent No.: US 9,156,154 B2
(45) Date of Patent: Oct. 13, 2015

(54) GIMBAL ASSEMBLY FOR TOOL SUPPORT

(75) Inventors: Garrett W. Brown, Philadelphia, PA (US); Anthony D. Sacksteder, Philadelphia, PA (US)

(73) Assignee: Garrett W. Brown, Philadelphia, PA (US)

( * ) Notice: Subject to any disclaimer, the term of this patent is extended or adjusted under 35 U.S.C. 154(b) by 434 days.

(21) Appl. No.: 12/677,179

(22) PCT Filed: Sep. 13, 2008

(86) PCT No.: PCT/US2008/076331

§ 371 (c)(1),
(2), (4) Date: Aug. 16, 2010

(87) PCT Pub. No.: WO2009/039047

PCT Pub. Date: Mar. 26, 2009

(65) Prior Publication Data

US 2010/0301179 A1 Dec. 2, 2010

Related U.S. Application Data

(60) Provisional application No. 60/972,979, filed on Sep. 17, 2007.

(51) Int. Cl.
*F16M 13/00* (2006.01)
*B25H 1/00* (2006.01)

(52) U.S. Cl.
CPC ............ *B25H 1/0028* (2013.01); *B25H 1/0021* (2013.01)

(58) Field of Classification Search
CPC ............................ B25H 1/0028; B25H 1/0021
USPC .......... 248/124.1, 218.4, 219.1, 227.3, 229.1, 248/540, 62, 74.1, 229.23, 229.313
See application file for complete search history.

(56) References Cited

U.S. PATENT DOCUMENTS

| | | | | | |
|---|---|---|---|---|---|
| 790,850 | A | | 5/1905 | Pfeiffer | |
| 1,306,915 | A | * | 6/1919 | Klamroth | 116/174 |
| 1,375,554 | A | * | 4/1921 | Bridges | 384/449 |
| 1,494,638 | A | * | 5/1924 | Sheldon | 384/553 |

(Continued)

FOREIGN PATENT DOCUMENTS

| | | | |
|---|---|---|---|
| DE | 151483 | * | 5/1904 |
| DE | 8904387 U1 | | 6/1989 |

(Continued)

OTHER PUBLICATIONS

International Search Report & Written Opinion dated Nov. 28, 2008 for PCT/US08/76331.

(Continued)

*Primary Examiner* — Christopher Garft
(74) *Attorney, Agent, or Firm* — Joan T. Kluger; Barnes & Thornburg LLP

(57) ABSTRACT

A supporting and orienting apparatus that is angularly agile and can balance the weight of tools, and permits quick tool replacement is disclosed. An inner gimbal portion holds the tool at its center of balance and is rotationally disposed within an outer gimbal portion. The gimbal portion combination is rotationally attached to an articulated arm. The tool with one or both gimbal portions attached can be removed and replaced with another tool, also having gimbal portions attached such that the tool is automatically balanced when inserted into the support apparatus.

13 Claims, 14 Drawing Sheets

(56) References Cited

U.S. PATENT DOCUMENTS

| | | | | | |
|---|---|---|---|---|---|
| 1,505,567 | A | * | 8/1924 | Kelley | 81/119 |
| 1,674,669 | A | | 6/1928 | Percy | |
| 2,450,875 | A | | 10/1948 | Braddon et al. | |
| 2,490,628 | A | | 12/1949 | Isserstedt | |
| 2,599,269 | A | | 6/1952 | Markle | |
| 2,725,783 | A | | 12/1955 | Jackson | |
| 2,763,456 | A | | 9/1956 | Breer | |
| 2,899,882 | A | | 8/1959 | Wylie et al. | |
| 2,961,877 | A | | 11/1960 | Edwards | |
| 2,962,251 | A | | 11/1960 | Karpf | |
| 3,333,613 | A | | 8/1967 | Bosse | |
| 3,540,719 | A | | 11/1970 | Romney | |
| 3,604,660 | A | | 9/1971 | Marley | |
| 3,638,502 | A | | 2/1972 | Leavitt | |
| 3,694,888 | A | | 10/1972 | Bosse | |
| 3,756,549 | A | | 9/1973 | Lange | |
| 3,776,494 | A | | 12/1973 | Baucheron | |
| 3,917,200 | A | | 11/1975 | Johnson | |
| 4,017,168 | A | | 4/1977 | Brown | |
| 4,033,541 | A | | 7/1977 | Malveg | |
| 4,156,512 | A | | 5/1979 | Brown | |
| 4,158,490 | A | * | 6/1979 | Gottschalk et al. | 352/243 |
| 4,206,983 | A | | 6/1980 | Nettman | |
| 4,208,028 | A | * | 6/1980 | Brown et al. | 224/185 |
| 4,265,147 | A | * | 5/1981 | Fox | 81/55 |
| 4,270,387 | A | | 6/1981 | Hoffman | |
| 4,474,439 | A | * | 10/1984 | Brown | 352/243 |
| RE32,213 | E | | 7/1986 | Brown | |
| 4,610,560 | A | | 9/1986 | Miller | |
| 4,625,938 | A | | 12/1986 | Brown | |
| 4,685,649 | A | | 8/1987 | McKay | |
| 4,700,827 | A | | 10/1987 | Haaser | |
| 4,710,819 | A | | 12/1987 | Brown | |
| 4,756,655 | A | | 7/1988 | Jameson | |
| 4,805,615 | A | | 2/1989 | Carol | |
| 4,946,272 | A | | 8/1990 | Brown | |
| 4,989,466 | A | | 2/1991 | Goodman | |
| 5,098,182 | A | | 3/1992 | Brown | |
| 5,109,736 | A | | 5/1992 | Dixon | |
| 5,111,983 | A | | 5/1992 | Simmons et al. | |
| 5,135,190 | A | | 8/1992 | Wilson | |
| D329,449 | S | | 9/1992 | Brown et al. | |
| 5,229,798 | A | | 7/1993 | Brown | |
| 5,330,233 | A | * | 7/1994 | Kress | 285/9.2 |
| 5,360,196 | A | | 11/1994 | DiGiulio et al. | |
| 5,389,987 | A | | 2/1995 | Corbeil | |
| D358,832 | S | | 5/1995 | Lenney | |
| 5,531,536 | A | * | 7/1996 | Blanchfield et al. | 403/340 |
| 5,544,554 | A | * | 8/1996 | Brightly | 81/57.4 |
| 5,575,580 | A | * | 11/1996 | Parrish et al. | 403/49 |
| 5,579,071 | A | | 11/1996 | Wetzel | |
| 5,609,316 | A | | 3/1997 | Tigliev | |
| 5,669,122 | A | | 9/1997 | Benoit | |
| 5,752,112 | A | | 5/1998 | Paddock | |
| 5,785,447 | A | * | 7/1998 | Fonti et al. | 403/49 |
| 5,797,054 | A | * | 8/1998 | Paddock et al. | 396/421 |
| 5,857,815 | A | | 1/1999 | Bailey et al. | |
| 5,963,749 | A | | 10/1999 | Nicholson | |
| 6,030,130 | A | | 2/2000 | Paddock et al. | |
| 6,149,506 | A | | 11/2000 | Duescher | |
| 6,164,609 | A | * | 12/2000 | Eslambolchi et al. | 248/218.4 |
| 6,293,676 | B1 | | 9/2001 | Holway | |
| 6,377,011 | B1 | | 4/2002 | Ben-Ur | |
| 6,393,708 | B1 | | 5/2002 | Culver et al. | |
| 6,431,514 | B1 | * | 8/2002 | Ailing | 248/315 |
| 6,578,967 | B1 | | 6/2003 | Paddock | |
| 6,708,935 | B2 | | 3/2004 | Smeed | |
| 6,711,972 | B1 | | 3/2004 | Joyner et al. | |
| 6,852,107 | B2 | | 2/2005 | Wang et al. | |
| 6,896,230 | B2 | | 5/2005 | Cvek | |
| 6,923,505 | B2 | | 8/2005 | Siminovitch et al. | |
| 7,000,883 | B2 | | 2/2006 | Mercadal | |
| 7,055,789 | B2 | | 6/2006 | Libbey et al. | |
| 7,065,888 | B2 | | 6/2006 | Jaklitsch | |
| 7,270,076 | B2 | * | 9/2007 | Evans | 116/174 |
| 7,290,744 | B2 | | 11/2007 | Baldasari | |
| 7,325,777 | B2 | | 2/2008 | Thiessen | |
| 7,371,028 | B2 | | 5/2008 | Gordon | |
| 7,412,754 | B2 | | 8/2008 | Hanson | |
| 7,618,016 | B2 | | 11/2009 | Brown | |
| 7,625,090 | B2 | | 12/2009 | Brown | |
| 2003/0194229 | A1 | * | 10/2003 | Linden | 396/419 |
| 2005/0023015 | A1 | * | 2/2005 | Argento | 173/36 |
| 2005/0127258 | A1 | * | 6/2005 | Lapointe et al. | 248/218.4 |
| 2006/0065801 | A1 | * | 3/2006 | Anderson, II | 248/311.2 |
| 2006/0186281 | A1 | | 8/2006 | Thiessen | |
| 2006/0231700 | A1 | | 10/2006 | Orf et al. | |
| 2006/0262274 | A1 | | 11/2006 | Brown et al. | |
| 2007/0050139 | A1 | | 3/2007 | Sidman | |
| 2008/0001053 | A1 | * | 1/2008 | Sandy | 248/544 |
| 2008/0046122 | A1 | | 2/2008 | Manzo | |

FOREIGN PATENT DOCUMENTS

| | | |
|---|---|---|
| EP | 0192253 | 8/1986 |
| EP | 0429008 | 5/1991 |
| EP | 1312251 | 5/2003 |
| GB | 593231 | 10/1947 |
| GB | 2170651 | 8/1986 |
| GB | 2325393 | 11/1998 |
| WO | 0016950 | 3/2000 |
| WO | WO 2006113416 | 10/2006 |
| WO | WO 2008112687 | 9/2008 |

OTHER PUBLICATIONS

International Search Report & Written Opinion dated May 12, 2009 for PCT/US09/37384.

Information Disclosure Statement dated Jan. 13, 2010 for U.S. Appl. No. 11/859,526.

Office Action dated Oct. 13, 2006 for U.S. Appl. No. 11/060,612.

Response to Oct. 13, 2006 Office Action for U.S. Appl. No. 11/060,612.

Office Action dated Dec. 28, 2006 for U.S. Appl. No. 11/060,612.

Response to Dec. 28, 2006 Office Action for U.S. Appl. No. 11/060,612.

Office Action dated Jun. 19, 2007 for U.S. Appl. No. 11/060,612.

Response to Jun. 19, 2007 Office Action for U.S. Appl. No. 11/060,612.

Office Action dated Nov. 13, 2008 for U.S. Appl. No. 11/737,567.

Notice of Allowability dated Oct. 9, 2007 for U.S. Appl. No. 11/060,612.

Office Action dated Apr. 13, 2010 for U.S. Appl. No. 11/859,526.

Information Disclosure Statement dated Feb. 23, 2010 for U.S. Appl. No. 12/674,731.

International Search Report and Written Opinion dated Nov. 7, 2008 for PCT Patent Application No. PCT/US2008/074554.

Supplementary European Search Report dated Apr. 20, 2011 for European Patent Application No. 08799533.8.

Extended European Search Report for European Patent Application No. 09813385.3 dated Apr. 28, 2014.

* cited by examiner

FIG. 8A
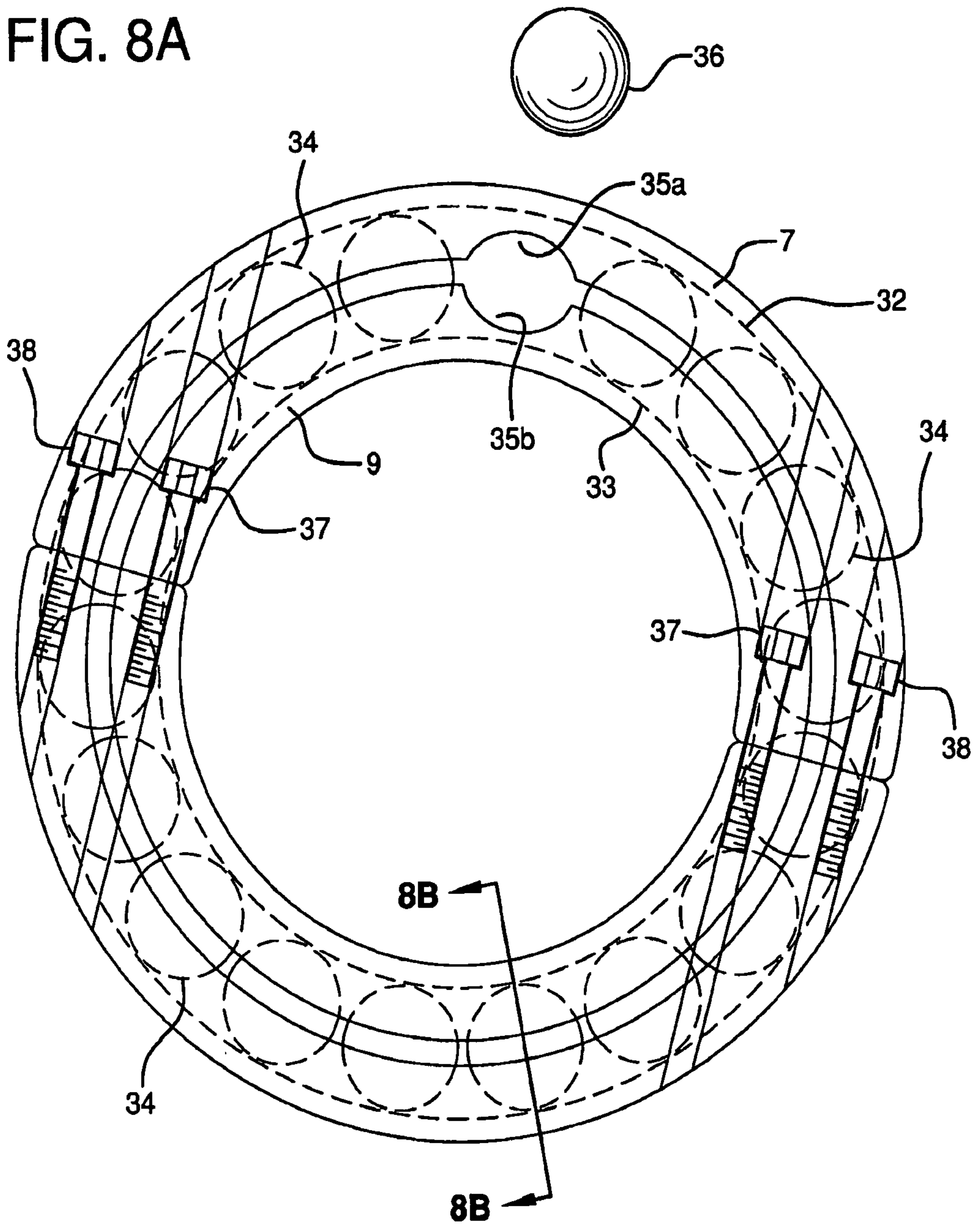
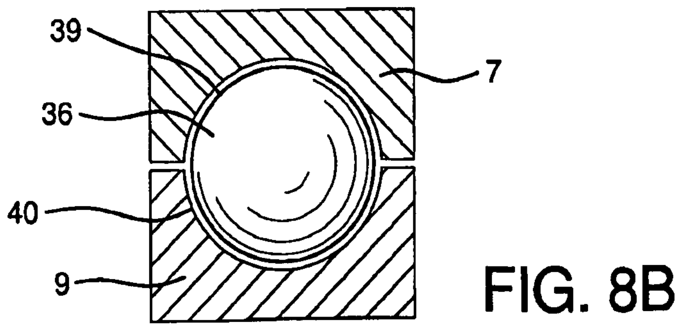
FIG. 8B

GIMBAL ASSEMBLY FOR TOOL SUPPORT

This application is based on, and claims priority to, U.S. provisional application Ser. No. 60/972,979, filed Sep. 17, 2007, and entitled Removable Gimbal for Tool Support.

FIELD OF THE INVENTION

Illustrative embodiments of the invention relate to equipment for supporting and orienting objects such as tools.

BACKGROUND OF THE INVENTION

In many industrial and business environments, workers are often required to repetitively lift, position and orient tools, sometimes of significant weight, and deploy them anywhere within the reach of their arms, from low to overhead to extend out in front. The resulting stresses, particularly from overhead usages, or near-full extension of the arm, are a common cause of work-related shoulder and forearm injuries.

Ergonomic equipment supports are known in the art, including 'tool balancers' that suspend tools on wires from retractable reels. Tool balancers require unobstructed access to overhead, usually fixed, attachment points, which tend to restrict the users lateral freedom of movement. Also, since the tools usually dangle in a bottom heavy condition from crude attaching eyelets, maintaining a desired angular orientation is impeded. Even those few balancer installations that connect to annular bearings around the tool body are still restrictive of other axes of freedom. Furthermore, they can only be installed on tools of a cylindrical construction that permit the unobstructed passage of the inner bearing race along the tool body to the desired point of attachment. Importantly, such balancers cannot be used at all for work locations that are inaccessible to overhead support, such as underneath cars on assembly lines.

Articulated support arms that do not require overhead mounting exist for supporting cameras and medical devices such as x-ray machines. Some may include two or three-axis gimbal attachments to provide angular freedom between the arm and the supported equipment, but these gimbal designs are not appropriate for the majority of tool configurations and/or conditions of use. Additionally, the center-of-gravity of a given tool is often located within a non-cylindrical section of the tool body, which may be inaccessible to the sliding installation of a bearing of appropriate size. Conventional gimbals also cannot be conveniently and quickly removed to facilitate the use of the tool in a separate location, or the rapid replacement of the tool with another. The use of conventional three-axis gimbals would mandate a proliferation of expensive supporting and orienting means, each adapted to a different tool, to be located within the same workplace or production line station.

Accordingly, there is a need for versatile, ergonomic, and angularly agile tool support systems, which can accommodate tools of various sizes, shapes, configurations and internal distributions of mass. There is also a need for a support system allowing the quick replacement and substitution of tools within the local workplace, without cluttering the tools with redundant and expensive affixed hardware.

What is needed is a quickly removable gimbal attachment, adaptable to be mounted around the tool's center-of-mass, and that provides substantially unrestricted angular freedom for orienting and positioning a variety of tools, but is preferably not bulky or expensive.

What is also needed is an angularly agile tool mount that can accommodate a tool around its center of mass, even if obstructions, bends, bulges or projections prevent the sliding installation of a conventional, unitary bearing assembly.

SUMMARY OF THE INVENTION

Illustrative embodiments of the invention are directed to a supporting and orienting apparatus that is angularly agile and can balance the weight of tools, and that preferably permits quick tool or tool component replacement or substitution. Particular embodiments of the invention can be installed around tool-body locations that preclude the use of traditional tool mounts providing rotational freedom.

Embodiments of the invention provide a support and orienting system for tools or other objects. "Tools" is used herein in a broad sense and includes various types of equipment, instruments and devices.

Illustrative embodiments of the support and orienting system include a device into which a tool is secured. The securing device is an inner portion of a gimbal or similar device. The securing device with the tool held therein, is inserted into an outer gimbal portion or analogous structure allowing the tool, along with the securing device, to rotate therein. The rotation can be accomplished in a number of ways, but generally requires complementary rotational components disposed on the device to which the tool is secured and the component into which the tool securing device is inserted.

Additional axes of rotation can be provided by pivotally securing the gimbal assembly to a yoke. The yoke can then be pivotally secured to an articulated support arm. The articulated support arm allows the tool to be positioned over an area of reach of the support arm. This freedom of movement, together with the various axes of rotation, allows the tool to be positioned in locations and orientations analogous to those attainable without the support system when a user is stationed in that area. Preferably the support arm has an upwardly biasing force to act against the force of gravity. Thus, the advantage of the support system is that it reduces the effective weight being lifted or moved by the user, while still allowing the freedom of movement necessary to operate or utilize the tool.

The tool securing device can be designed to be readily removable from the complementary outer component to allow easy replacement of tools or components thereof. This can be accomplished for example, by providing an outer component that is segmented into arcuate pieces and hinging at least two adjacent segments together. Thus, the receptacle can be opened to lift the tool together with its securing device out of the outer component.

The invention also includes methods of utilizing tools and relieving workplace stresses by providing a support and orienting system.

DESCRIPTION OF THE DRAWINGS

For further detail regarding illustrative embodiments of the invention, reference is made to the detailed description provided below, in conjunction with the following illustrations:

FIGS. 8*a* and 8*b* depict a gimbal employing segmented inner and outer gimbal portions and captured ball bearings inserted between them according to an illustrative embodiment of the invention.

DETAILED DESCRIPTION OF THE INVENTION

Illustrative embodiments of the invention offer a support and orienting apparatus that can provide numerous degrees of freedom. Preferably, one or more of the system's elements are modular, sectional, removable and/or capable of disassembly in order to provide mounting flexibility and/or interchangeability, as well uncluttered access to the tool.

Figure 1A:
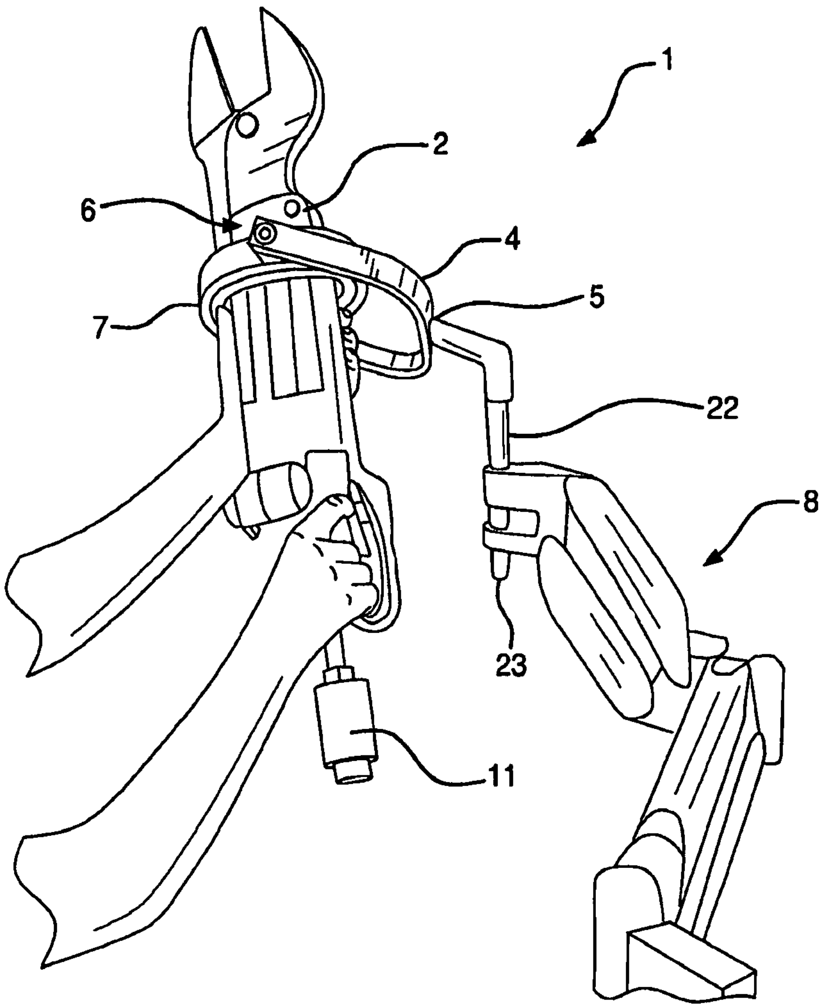
FIG. 1*a* depicts a 'squeezer' rivet tool mounted in a gimbal assembly attached to an articulated support arm shown at nearly its highest position according to an illustrative embodiment of the invention.

FIG. 1*a* depicts a tool support system according to an illustrative embodiment of the invention. A 'squeezer' rivet tool 2 is shown mounted in a gimbal assembly 1 attached to an articulated support arm 8, shown at nearly its highest position. For many applications it is preferable that the gimbal assembly is removable from the articulated support arm 8 and/or that various parts within the assembly are detachable from one another, particularly in a readily removable manner. Rivet tool 2 is captured at nearly its longitudinal center of balance within gimbal assembly 1. Balancing component 11 provides a balance adjustment so the tool can be balanced around a line between outer gimbal portion pivot locations 6 on yoke 4. The balancing component can be adjustable, such as by including substitutable weights or an adjustment to the weight's location, to effectively adjust the center of mass of the tool. Inner gimbal portion 9, as more clearly seen in FIG. 1*b*, rotates by engaging a plurality of roller wheels 16 (see FIG. 2*b*) preferably attached symmetrically around the inner surface of outer gimbal portion 7, and also pivots around outer gimbal portion pivots 6 and in an additional plane via yoke pivot 5.

Figure 1B:
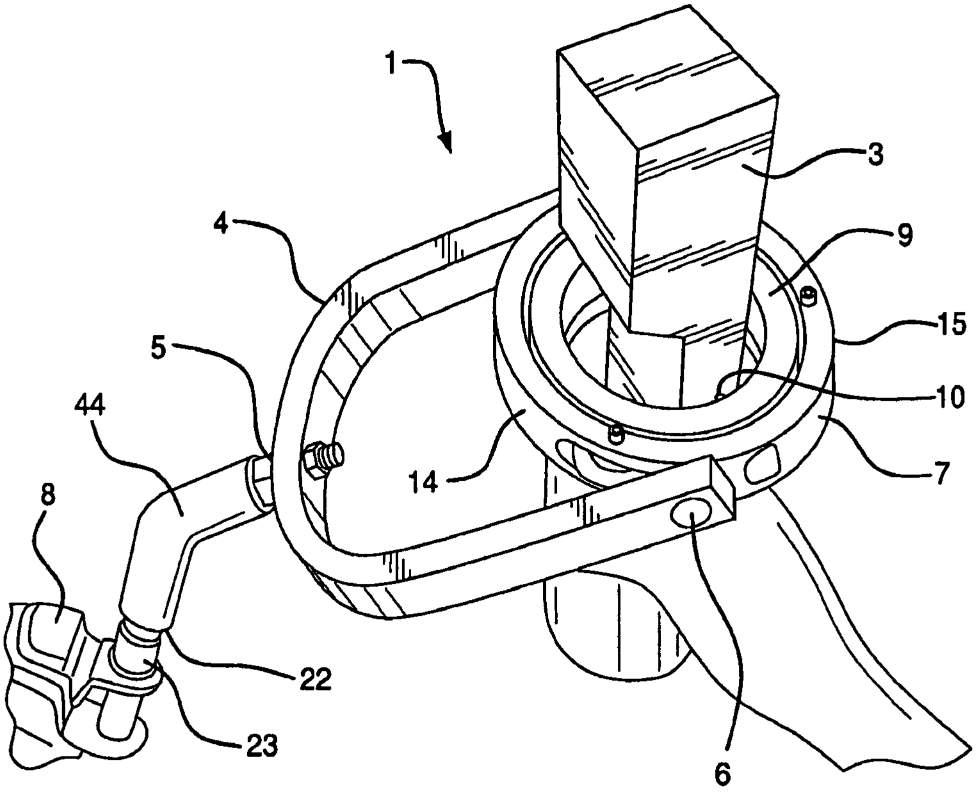
FIG. 1*b* shows a gimbal with a bucking bar mounted within an inner gimbal portion, which is rotatable within a wheeled outer gimbal portion that is pivotally attached to a gimbal yoke that is itself pivotable around an additional axis according to an illustrative embodiment of the invention.

Advantageously, the angular freedom created by the movement of the inner gimbal portion within the outer gimbal portion allows the user to orient the tool by rotation of the user's wrist and/or arm, closely mimicking unsupported tool use. This added degree of freedom greatly enhances the benefits of the support system. The swiveling action of yoke mounting socket 22 around arm mounting post 23 provides an additional degree of freedom. Therefore, as can be seen in FIG. 1*b*, a total of four axes of angular freedom for tool 2 are provided in this embodiment. Additional degrees of freedom can be provided by adding pivotally connected components at various locations. In a preferred embodiment of the invention, the combination of the gimbal and the support arm permits positioning and orientation of a heavy tool almost anywhere within reach of the operator's arms, and in almost any direction, with only fingertip pressure, and relieves the continual strain of supporting and accurately pointing a burdensome object. Although some aspects of the invention are described with respect to heavy objects, embodiments of the invention can be used for relatively lightweight tools.

FIG. 1*b* shows a tool support according to an illustrative embodiment of the invention. A gimbal assembly 1 is mounted by means of yoke socket 22 to arm mounting post 23, which is attached to articulated support arm 8 (partially visible). A 'bucking bar' 3 is mounted within inner gimbal portion 9 by means of a plurality of mounting set screws 10, which engage bucking bar 3 at approximately its longitudinal center of balance. Inner gimbal portion 9 is preferably arcuately segmented to facilitate insertion of a tool. For certain applications it may not be necessary to segment inner gimbal portion 9.

Inner gimbal portion 9 is rotatable within wheeled outer gimbal portion 7. The wheels provide freedom of movement of inner gimbal portion 9 within outer gimbal portion 7. This effect can also be achieved with the wheels positioned on inner gimbal portion 9 and engaged with a race in outer gimbal portion 7. Other mechanisms to provide freedom of movement can be used, such as ball bearings or low friction materials. An example of use of a low friction material includes a circumferential channel on the inner surface of outer gimbal portion 7, with a complementary ridge on the outer surface of inner gimbal portion 9, or vice versa, wherein the channel and/or ridge are fabricated of a low friction material such as Teflon®.

FIG. 1*b* shows outer gimbal portion 7 pivotally attached via outer gimbal portion pivot 6 to gimbal yoke 4, which is itself pivotable around an additional axis by means of yoke pivot 5. This combination enables a worker to position and precisely orient the bucking bar (which provides reactive mass to counter the impact of rivet-pounding tools).

Figure 2A:
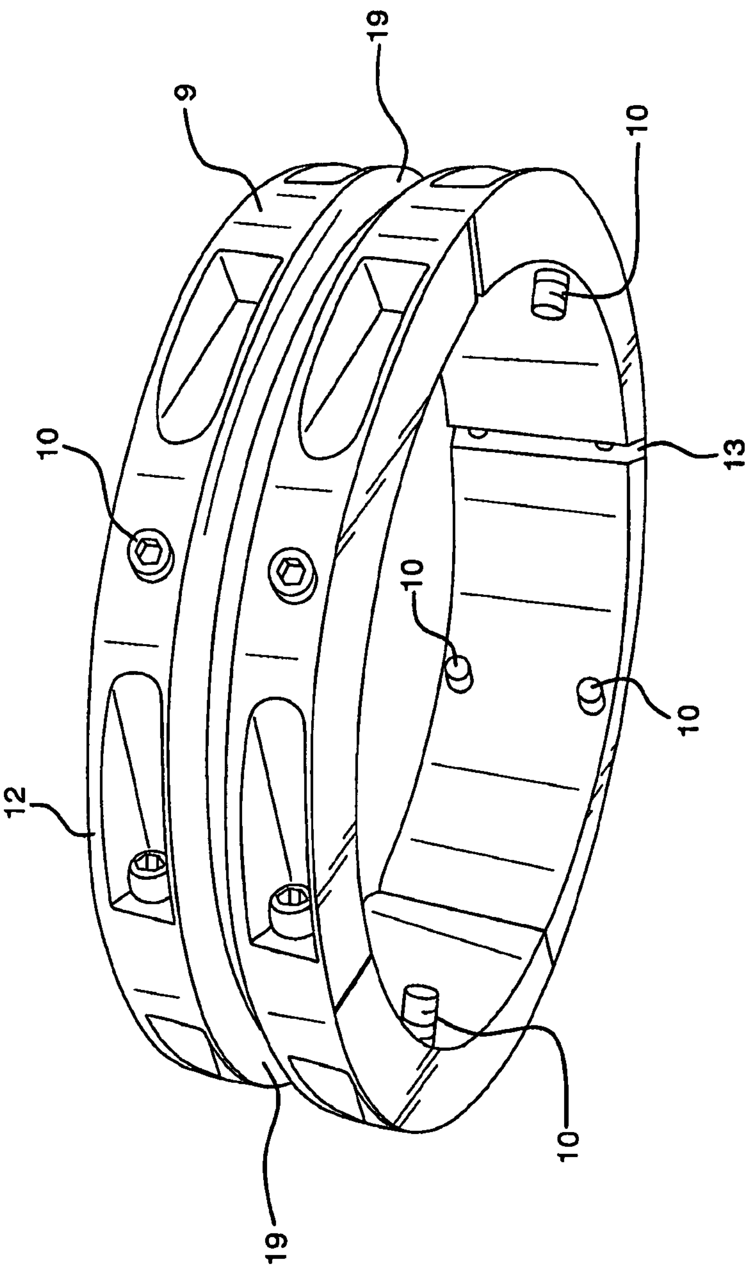
FIG. 2*a* depicts a four-section inner gimbal portion assembly including a grooved central track to accept roller wheels of an outer gimbal portion according to an illustrative embodiment of the invention.
Figure 2B:
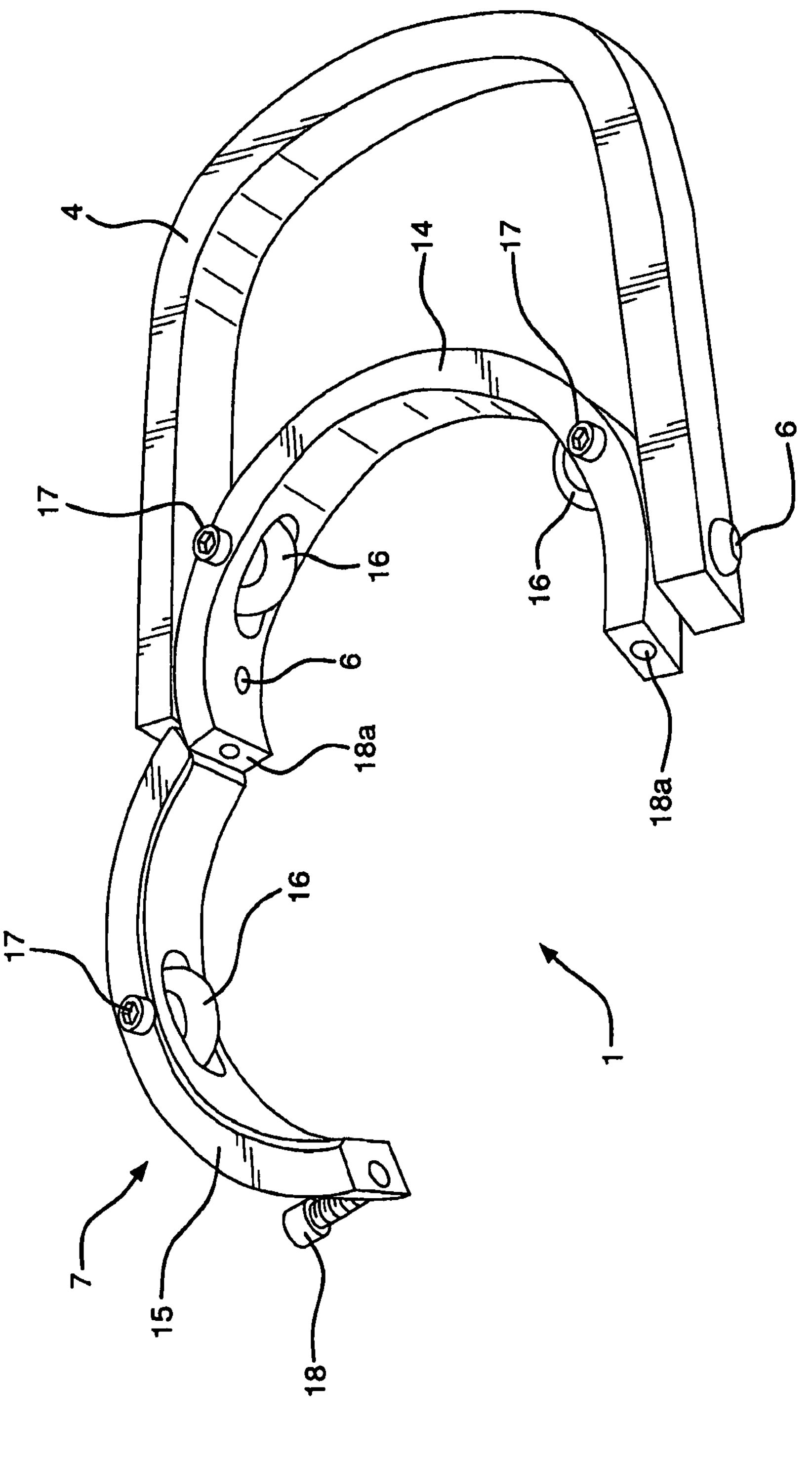
FIG. 2*b* shows a separated two-section, outer gimbal portion including roller wheels, yoke pivots and gimbal yoke according to an illustrative embodiment of the invention.
Figure 4A:
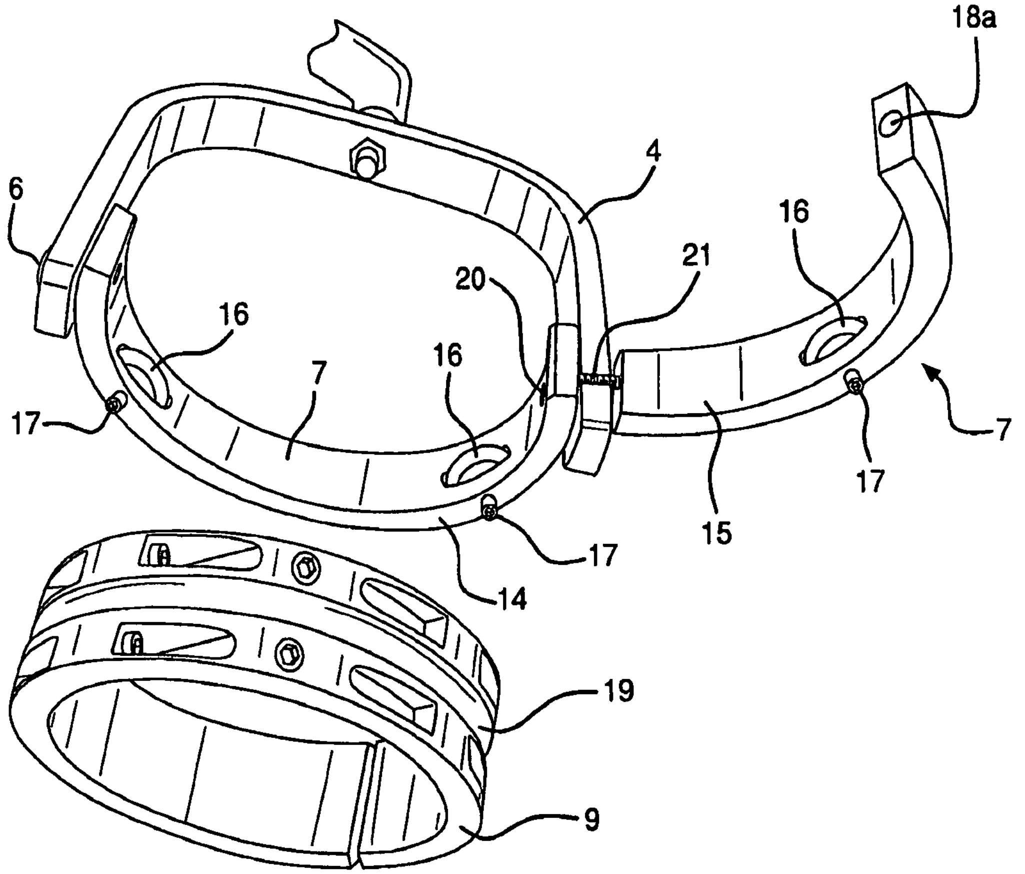
FIG. 4*a* depicts a hinged gated outer gimbal portion shown in the open position, with its sectional inner gimbal portion assembly removed according to an illustrative embodiment of the invention.

Turning now to FIGS. 2*b* and 4*a*, viewed in conjunction with FIG. 1*b*, replacement of the bucking bar will now be explained. In an illustrative embodiment of the invention, support arm 8 can be 'docked', for example by engaging a conventional pin and socket. The bucking bar 3 can be tilted to lie horizontally in outer gimbal portion major section 14 (see FIGS. 2*b* and 4*a*). By unclamping the gated minor section 15 of outer gimbal portion 7 and swinging it open on its hinge, bucking bar 3 with its inner gimbal portion 9 attached can be lifted out and quickly replaced by a version with a different profile, for example, but with its own pre-mounted inner gimbal portion.

FIG. 2*a* shows an inner gimbal portion assembly 9 according to an illustrative embodiment of the invention, adapted to be either clamped, by radial clamping screws 12 and/or a plurality of mounting set screws 10, so that even an irregularly-shaped tool can be securely attached to the assembly. Track groove or race 19 captures roller wheels 16 associated with outer gimbal portion 7, to allow inner gimbal portion 9 to rotate freely within outer gimbal portion 7 while being held in place. Pinch grooves 13 can be provided to prevent resilient material disposed on a tool from bulging between inner gimbal portion segments and interrupting the rolling integrity of inner gimbal portion 9 within outer gimbal portion 7. The track rollers or wheels should have slightly smaller sectional diameters than the corresponding track grooves in which they are to ride.

FIG. 2*b* depicts a gimbal assembly 1 according to an illustrative embodiment of the invention, showing major outer gimbal portion segment 14 and minor outer gimbal portion gate 15 in an opened position. Clamp screws 18 (only one shown) attach outer gimbal portion segments 14, 15 to one another at clamp screw locations 18*a*.

Note that one or more over-centers clamps 25 (see FIG. 6), of the sort that seal 'Mason Jars' could be employed, optionally in conjunction with a hinge to permit instantaneous opening of the outer gimbal portion gate and substitution of other tools fitted with appropriate inner gimbal portions. Other closing mechanisms that allow removal of inner gimbal portion 9 with the tool are within the spirit and scope of the invention. Preferably the mechanism allows easy opening and closing, but additional mechanisms may be useful or necessary depending in part on the type of tool and the use of the tool.

A plurality of roller wheels 16, turn on axles 17 and engage a track groove 19 of an inner gimbal portion to permit rotation of the inner gimbal portion. Yoke 4 is attached to outer gimbal portion 7 at pivot locations 6 by for example screws, as can be seen in FIG. 1*b*, which pass through pivot bearings within the extremities of yoke 4.

Figure 3A:
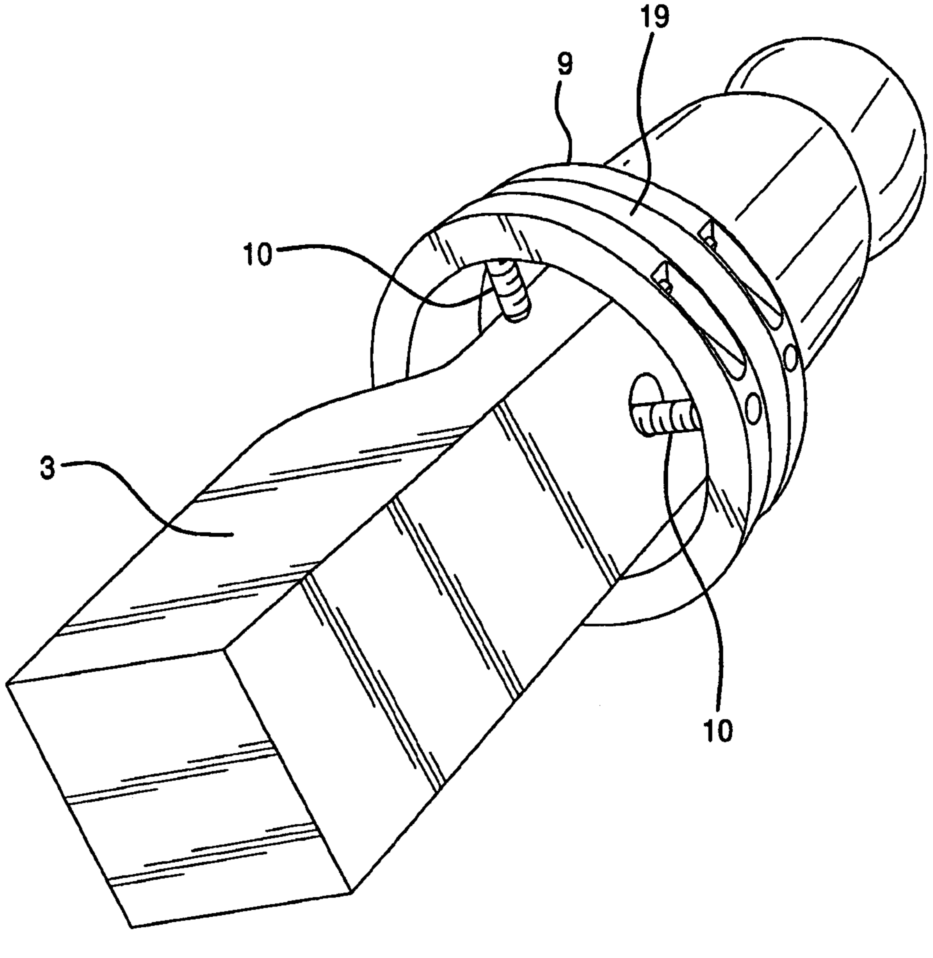
FIG. 3*a* shows an assembled two-section inner gimbal portion with circumferential track and mounted at the center of balance of a bucking bar by means of a plurality of set screws according to an illustrative embodiment of the invention.

FIG. 3*a* is an illustrative embodiment of a tool positioned in an inner gimbal portion assembly. FIG. 3*a* shows an assembled inner gimbal portion 9 with machined peripheral track 19, mounted at the longitudinal center of balance of bucking bar 3 by means of a plurality of set screws 10 positioned to appropriate lengths to engage accessible portions of the tool structure and, preferably, to permit any radial offset of the inner race track 19 in a direction that compensates for any irregularity in the axial center-of-balance of the tool—in this case caused by the central notch of missing steel in the construction of the bucking bar.

Figure 3B:
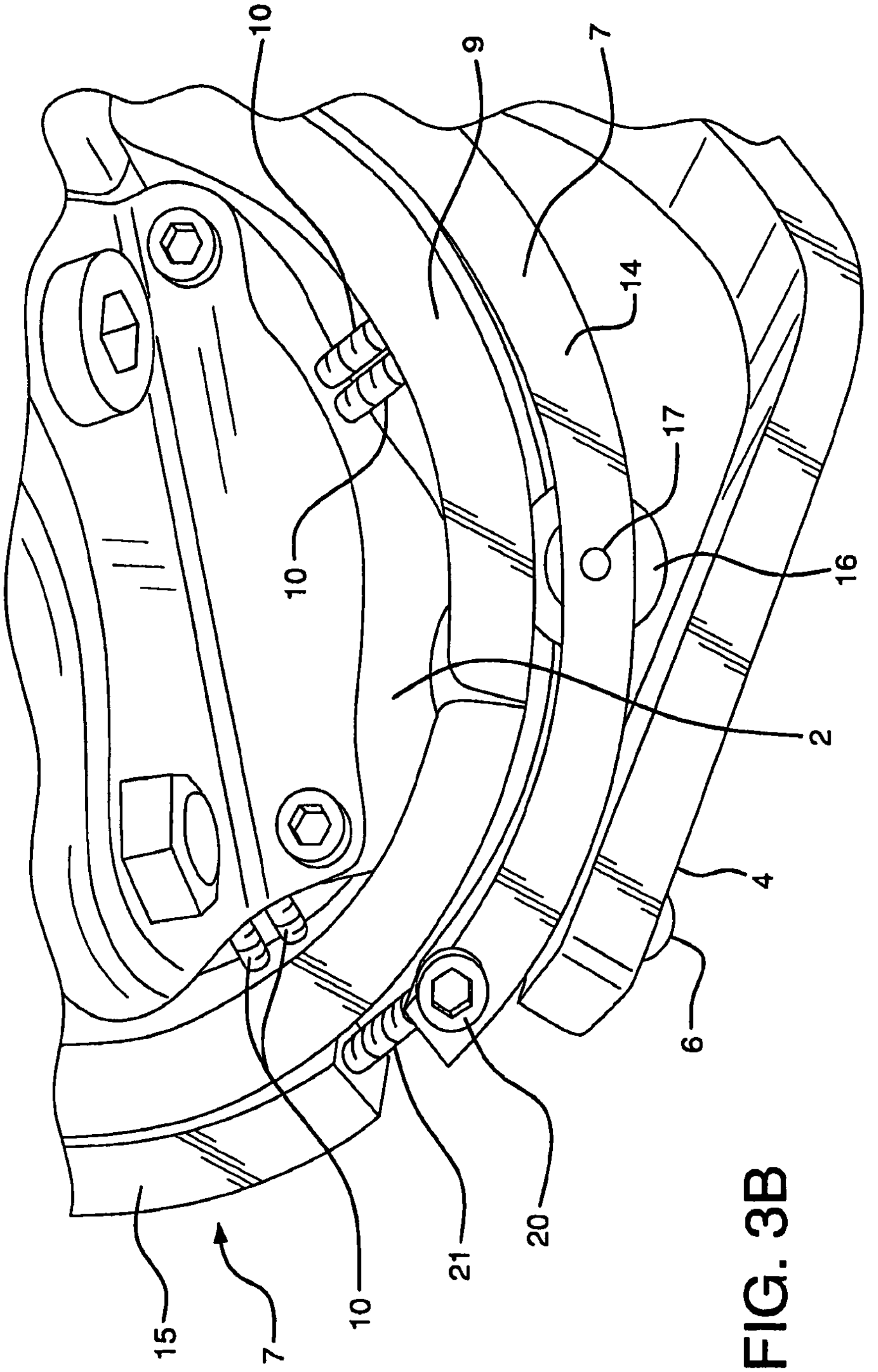
FIG. 3*b* shows a sectional inner gimbal portion mounted to the irregular surfaces of a rivet squeezer, also by means of a plurality of set-screws according to an illustrative embodiment of the invention.

FIG. 3*b* shows an illustrative embodiment of a portion of a sectional inner gimbal portion 9 mounted to the irregular surfaces of a rivet squeezer 2, by means of a plurality of set-screws 10. Circumferentially spaced rollers 16, turning on axles 17 mounted within notches in outer gimbal portion 7 engage a track in inner gimbal portion 9 to permit free rotation of rivet tool 2 within outer gimbal portion 7. Outer gimbal portion 7 consists of major segment 14 and minor segment 15 hinged together at gate hinge axle 20 to permit removal of rivet squeezer 2 together with the attached inner gimbal portion 9. Yoke 4 is pivotally engaged with outer gimbal portion 7 at yoke pivot locations 6.

FIG. 4*a* shows an illustrative embodiment of a gated outer gimbal portion 7 in an opened position, with its inner gimbal portion 9 removed. Gate section 15 can be unclamped from major section 14 and/or released by a screw fastening at screw location 18*a* to swing aside, as shown, around gate hinge axle 20, to permit removal of inner gimbal portion 9 and any associated tool. Roller wheels 16, turning on axles 17 engage track groove 19. When gate section 15 is in an open position, inner gimbal portion 9 can be removed from the apparatus as shown. Strategic bevels to the inner edges of segment 14 can be incorporated to facilitate removal of inner gimbal portion 9.

Figure 4B:
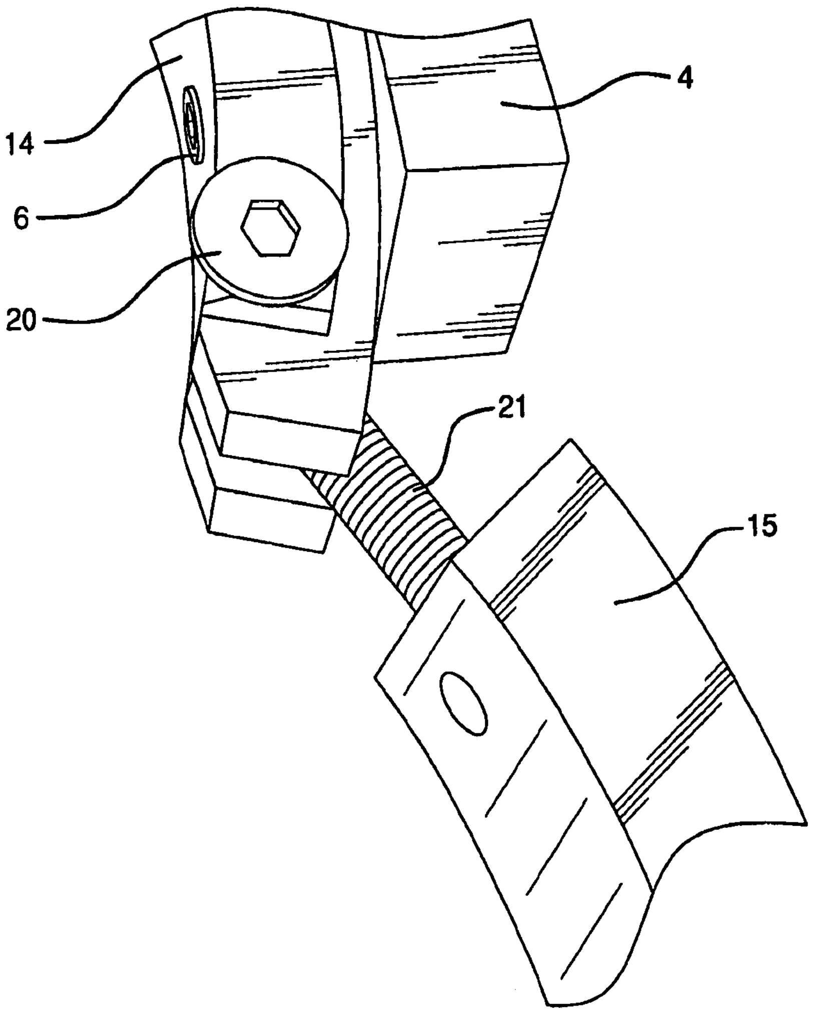
FIG. 4*b* shows a hinge offset beyond the centerline yoke pivot location according to an illustrative embodiment of the invention.

FIG. 4*b* depicts hinge axle 20 according to an illustrative embodiment of the invention. Outer gimbal portion minor segment 15 is shown in a position extended beyond the centerline that extends between the yoke pivot locations 6. Thus, outer gimbal portion segment 14 can pivot within yoke 4 even if minor outer gimbal portion segment 15 is swung aside. Gate hinge threaded eyebolt 21 permits gimbal portion segment 15 to be rotated in full-turn increments to adjust the diametric clearance between outer 7 and inner gimbal portion 9, and alter the tightness of engagement of wheels 16 with inner gimbal portion groove 19.

Figure 5A:
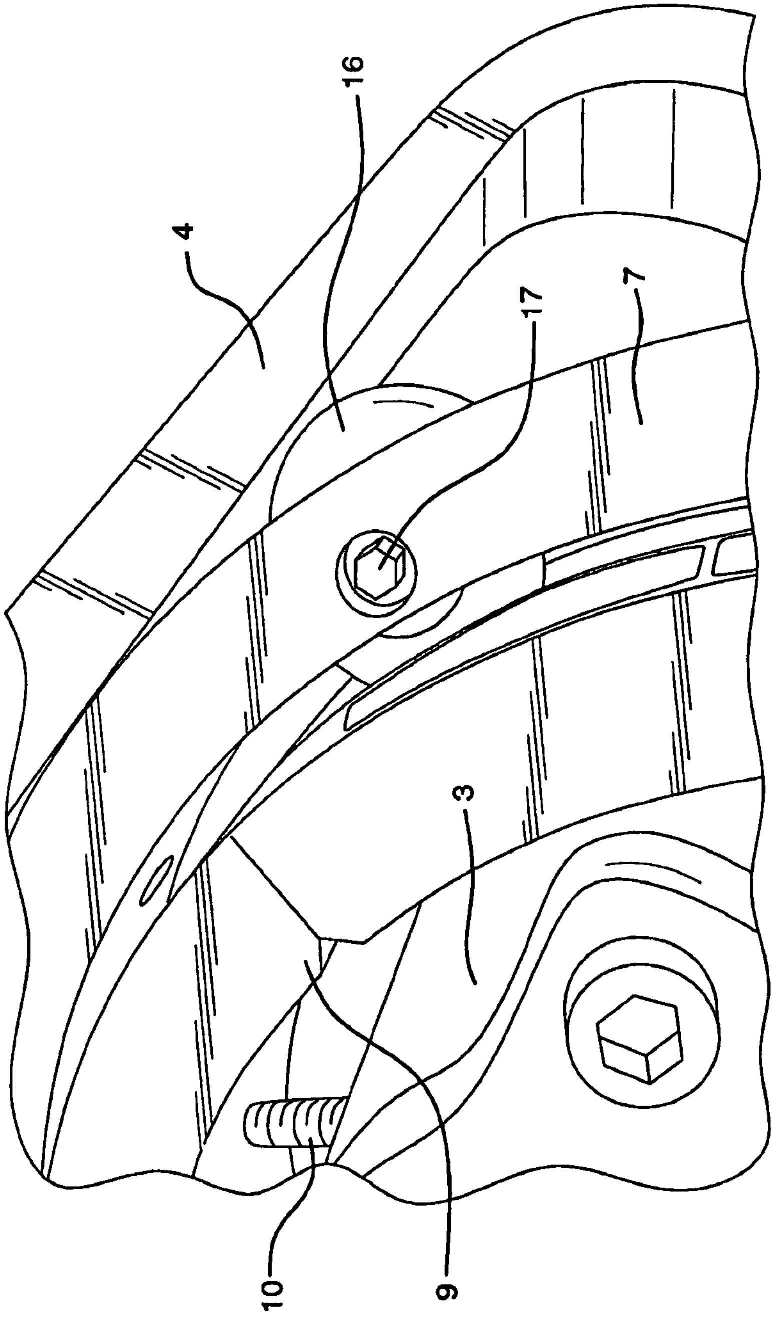
FIG. 5*a* depicts a V-shaped roller wheel mounted within an outer gimbal portion and engaging and capturing an inner gimbal portion groove according to an illustrative embodiment of the invention.

FIG. 5*a* depicts an illustrative embodiment of a roller wheel 16 mounted within outer gimbal portion 7 on axle 17 and engaging and capturing inner gimbal portion track groove 19. Inner gimbal portion 9 is shown attached to rivet tool 3 by means of a plurality of set screws 10.

Figure 5B:
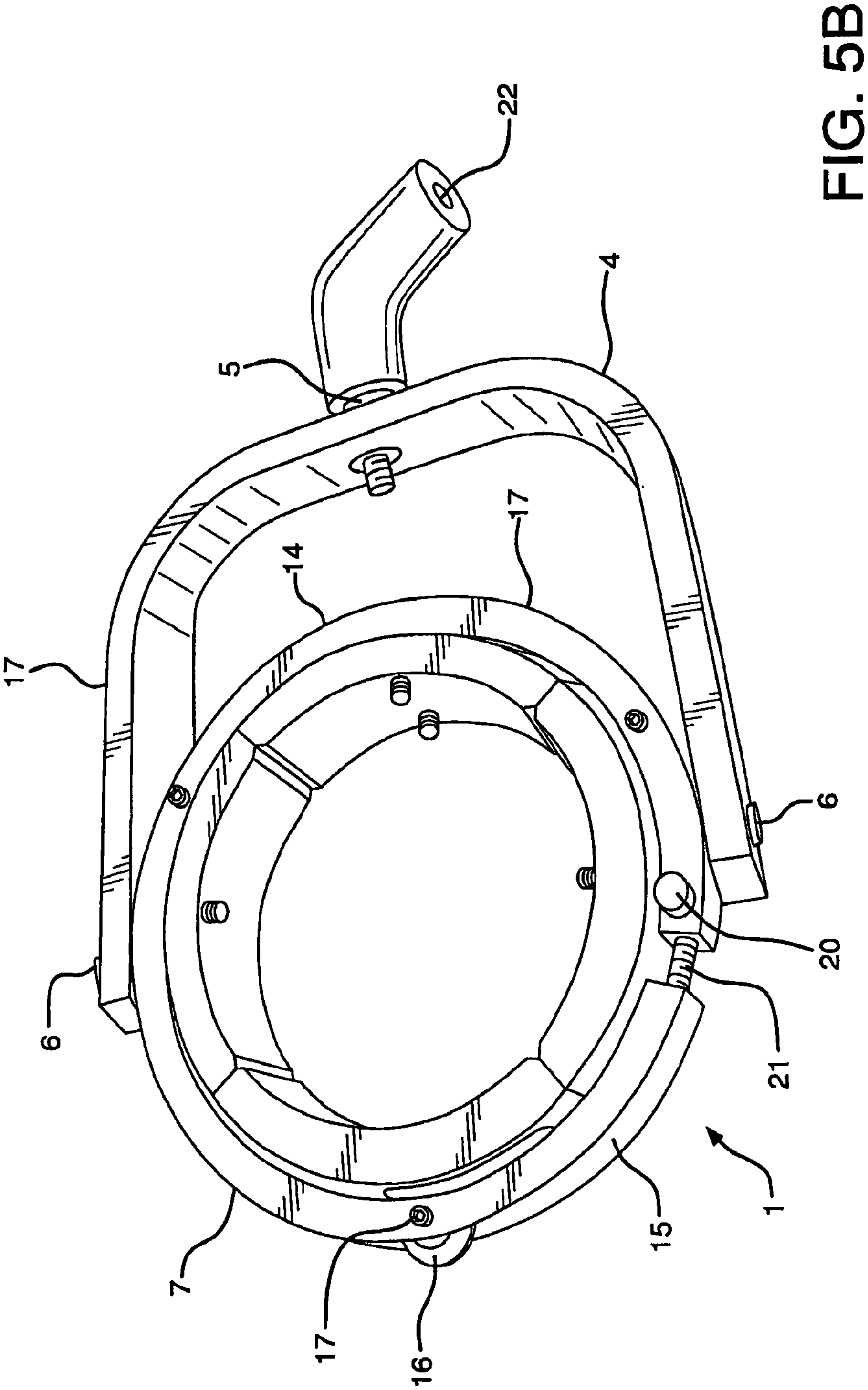
FIG. 5*b* shows a gated embodiment of a gimbal assembly including inner gimbal portion, outer gimbal portion with hinge and clamp, interconnecting wheels and doubly pivoting gimbal yoke according to an illustrative embodiment of the invention.

FIG. 5*b* shows an illustrative embodiment of a gimbal assembly 1. Inner gimbal portion 9 is disposed within outer gimbal portion 7. Outer gimbal portion 7 has hinge 20 to allow opening and closing of the gimbal portion. Wheels 16 are shown in this embodiment projecting from the exterior of outer gimbal portion 7 however, they may be situated flush with, or within the outer diameter of outer gimbal portion 7. The latter arrangements can provide protection of the wheels. Yoke 4 is shown pivotally connected to outer gimbal portion 7 at outer gimbal portion pivot locations 6 and to mounting socket 22 at yoke pivot 5.

Inner and outer gimbal portions 7 and 9 pivot around pivot axles 6 and pivot axis 5, which in this illustrative embodiment of the invention are about perpendicular to one another. Thus, gimbal assembly 1 provides three axes of angular freedom for a tool mounted within inner gimbal portion 9, not including any additional pivot points present, such as at the attachment point of gimbal assembly 1 to a support arm. Gimbal assembly 1 can be pivotally connected to a support arm (such as is shown in FIGS. 1*a* and 1*b*) by a yoke mounting socket 22 to provide the additional degree of angular freedom for the tool and associated gimbal assembly. Other attachment mechanisms can also be used. For example, the yoke structure may have a mounting post that fits within a mounting socket contained in the support arm or a mounting block attached thereto.

Figure 6:
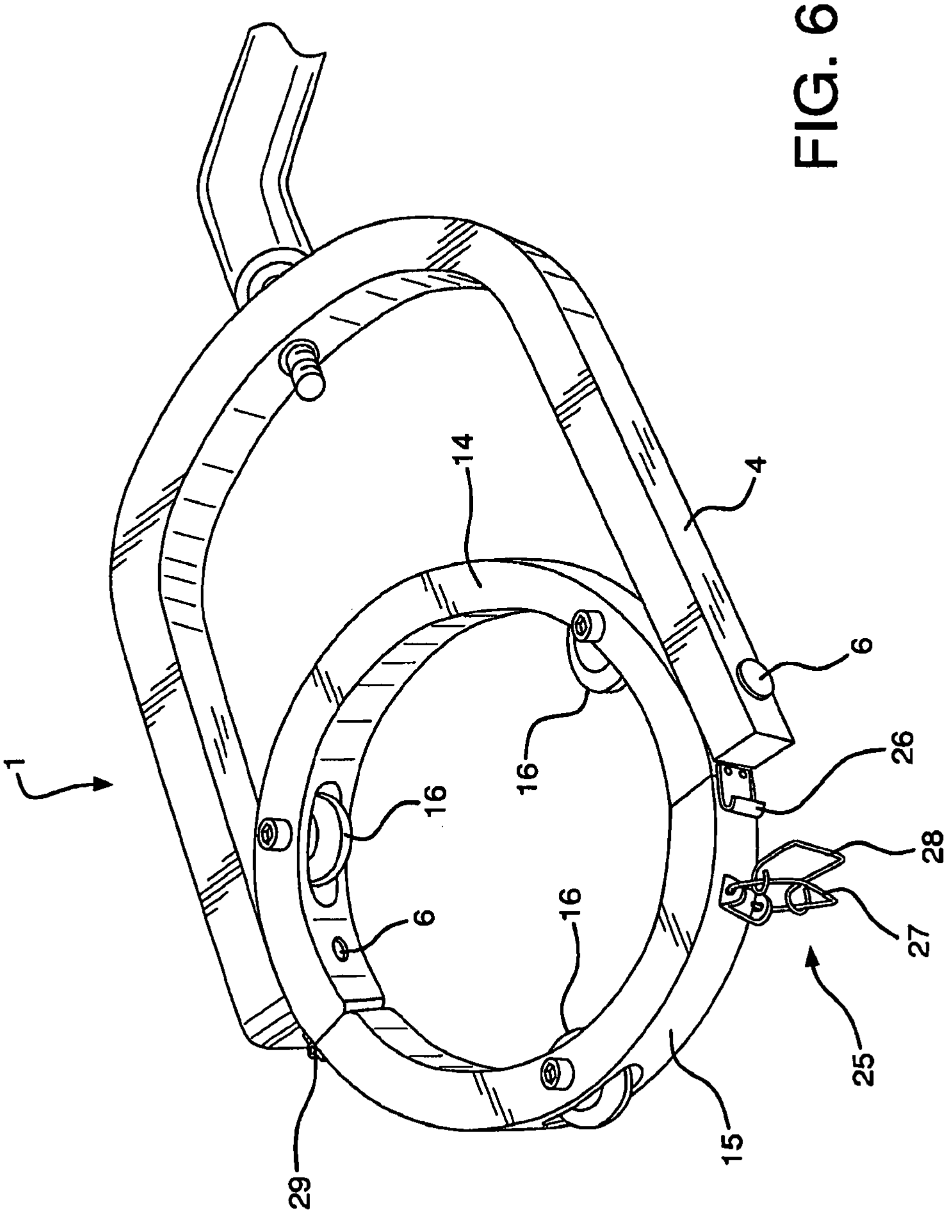
FIG. 6 shows a gimbal assembly including a hinged, clamping outer gimbal portion gate according to an illustrative embodiment of the invention.

FIG. 6 shows an illustrative embodiment of a gimbal assembly 1 including a hinged, outer gimbal portion gate having a minor outer gimbal portion segment 15 hinged to major outer gimbal portion segment 14 by hinge 29. Outer gimbal portion segments 14 and 15 are clamped together by an over-centers gate clamp assembly 25 having a gate clamp latch 26 engaged by clamp catch 28 and drawn tightly by clamp lever 27 in the manner of the well-known 'Mason jar' wire sealing clamps. Shown here in the unclamped mode, gate segment 15 can be swung away releasing an inner gimbal portion, having a tool encased therein, from engagement with roller wheels 16. When the tool and attached inner gimbal portion are re-installed, gate 15 can be swung shut and quickly clamped closed. Other clamps are within the spirit and scope of the invention, provided they can withstand any stresses created by tool and use of the apparatus.

Figure 7:
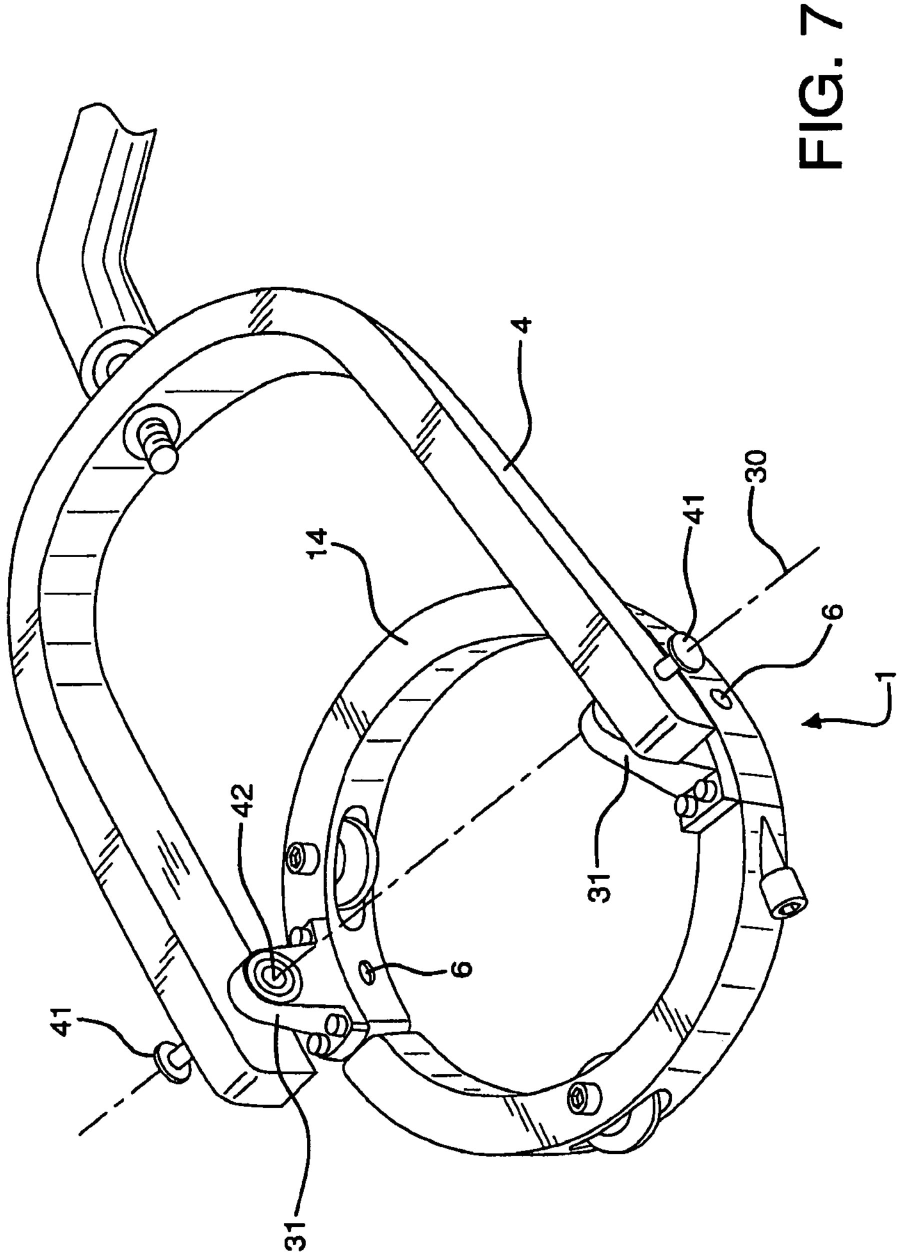
FIG. 7 shows a gimbal assembly including 'ears' to offset outer gimbal portion pivot locations to coincide with a tool's center-of-balance according to an illustrative embodiment of the invention.

FIG. 7 shows an illustrative embodiment of gimbal assembly 1 including pivot-mounting 'ears' 31 attached to outer gimbal portion major segment 14 or integral therewith. Pivot-mounting ears offset outer gimbal portion pivot locations 6 from the plane of outer gimbal portion 7 and coincide with centerline 30 in the event the center-of-balance of a tool is displaced from a possible mounting location with respect to an inner gimbal portion. In this embodiment, spring pins 41 engage pivot axis axle bearings 42, and if pulled apart also permit gimbal yoke 4 to be quickly removed.

FIGS. 8*a* and 8*b* are cross-sections of an illustrative embodiment of a gimbal employing ball bearings to facilitate rotation of segmented inner and outer gimbal portions 9 and 7 with respect to one another. Inner and outer gimbal portions 9 and 7 may or may not be segmented in alternative embodiments of the invention. Outer gimbal portion 7 has a groove 39 disposed therein to accommodate ball bearings 36. Inner gimbal portion 9 has a groove 40 disposed therein, to accommodate ball bearings 36. The diameters of grooves 39 and 40 are slightly larger than the diameter of ball bearings 36, so ball bearings 36 can freely rotate therein with a minimum of amount wobbling. Ball bearing profiles 34 shown as dotted circles, indicate the position of ball bearings captured between gimbal portions 9 and 7 prior to final tightening. To install the assembly, inner gimbal portion 9 is positioned at the appropriate location on a tool body and secured using a clamping mechanism such as inner gimbal portion clamp screws 37 and/or set screws (such as shown in FIG. 2*a*). Inner gimbal portion 9, with tool in place, is positioned and aligned with outer gimbal portion 7. Outer gimbal portion 7 is then partly tightened, for example by using outer gimbal portion clamp screws 38, so that ball bearing insertion notches 35*a* and 35*b* coincide with one another and yet are sufficiently apart to permit insertion of the ball bearings. Once final ball bearings 36 are inserted, clamp screws 38 can be tightened, reducing the size of the opening formed by notches 35*a* and 35*b*, thereby retaining the ball bearings in a channel formed between gimbal portions 7 and 9. The channel in which the ball bearings are contained is shown by dotted lines 32 and 33. This configuration of gimbal portions and ball bearings permits relative rotation of inner gimbal portion 9 and outer gimbal portion 7. In the illustrative embodiment shown in FIG. 8*a*, both the inner and outer gimbal portions would be secured to the tool, and this entire structure is intended to be removed for tool replacement. This can be achieved for example, using an easily releasable gimbal yoke attachment, such as by pivot extension ears and spring pins (shown for example in FIG. 7).It is possible to utilize ball bearings in a configuration wherein the inner and/or outer gimbal portions can be disengaged without removal or loss of the ball bearings. The outer gimbal portion can have ball bearings trapped therein in the inside circumference and the inner gimbal portion can have a complementary track on its outer circumference, or vice versa.

Figure 9:
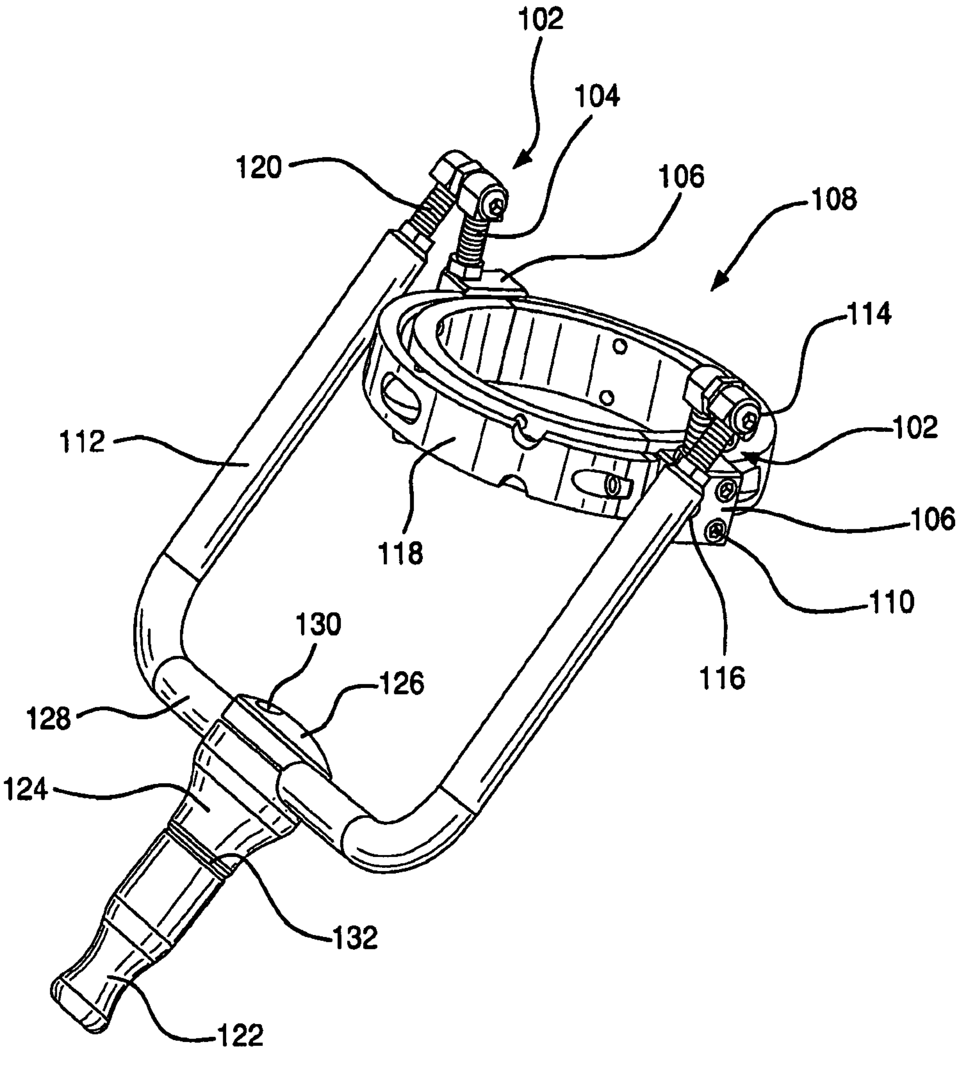
FIG. 9 depicts a gimbal assembly according to a further illustrative embodiment of the invention.

FIG. 9 depicts a gimbal assembly 108 according to an illustrative embodiment of the invention wherein an alternative to pivot-mounting 'ears' 31 (shown in FIG. 7) is provided. In both instances the pivot mounting ears offset the outer gimbal portion pivot locations from the plane of the outer gimbal portion. The pivot ears 102, shown in FIG. 9 however, include an adjustment mechanism to vary the position of the tool holder with respect to the yoke. The mechanism shown in FIG. 9 includes threaded members 104 attached to blocks 106. Blocks 106 are disposed on opposite sides of gimbal assembly 108. Threaded members 104 can be lengthened or shortened by rotating them with respect to blocks 106. Threaded members 104 are pivotally attached to yoke 112 at pivot locations 114. In this particular embodiment of the invention, threaded members 104 are inserted into blocks 106 and adjusted to the desired length. Blocks 106 are then attached to gimbal assembly 108 by screws 110. The particular embodiment of the invention shown in FIG. 9 has axle mounting locations 116 (partially shown) on blocks 106 to allow gimbal assembly 108 to be disposed within yoke 112 such that the pivot axis extends through outer gimbal portion 118, rather than it being offset using threaded members 104. Other mechanisms for displacing outer gimbal portion 118 away from the pivot axis are within the scope of the invention. For example, telescoping mechanisms with appropriate stops and locking mechanisms can be used.

FIG. 9 also depicts yoke arm extension members 120. Yoke arm extension members 120 function in a similar manner to threaded members 104, and also can be substituted with other extension mechanisms such as telescoping extensions. The offsets provided by threaded members 104 and extension members 120 can facilitate installation and use of tools of sizes and shapes that are not compatible with the non-extended yoke arms or the gimbal assembly in its non-offsetted position.

FIG. 9 also depicts a yoke mounting mechanism 122 having a first end attached to yoke 112 and a second end attached to an articulating arm or part intermediate thereto. Yoke mounting mechanism 122 comprises two attachment parts 124, 126 which either separate completely from one another or are hinged together, so they can be positioned to encircle the top bar 128 of yoke 112. A screw 130 or other fastener secures yoke mounting mechanism 122 to yoke 112. It is also possible for yoke mounting mechanism 112 to slide on to yoke top bar 128. Yoke mounting mechanism 112 optionally pivots at location 132. If no pivot is provided on yoke mounting mechanism 112, the yoke can be pivotally connected to an articulating arm or intermediate component to obtain an analogous degree of freedom.

A number of embodiments of the invention will now be generally described. In illustrative embodiments of the invention, the support and orienting apparatus will comprise a tool holder (such as inner gimbal portion 9) to secure the tool within the apparatus. To provide freedom of movement of the tool analogous to arm and wrist rotation for example, the secured tool will rotate within an outer component (such as outer gimbal portion 7). The inner and outer gimbal portions each have a rotation component complementary to one another that allows or facilitates the inner gimbal portion rotating within the outer gimbal portion. An example of complementary rotation components are inner gimbal portion race 19 ("first rotation component") and outer gimbal portion wheels 16 ("second rotation component"). The receptacles are preferably designed to facilitate removal or replacement of tools or tool components. Various configurations can be used to accomplish this, such as the arcuate segmenting shown in the figures (for example major and minor segments 14 and 15, respectively). The number of segments and the means for attaching them to one another can vary, provided they withstand the anticipated application of the device. Quick release, or hand-removable attachment mechanisms lend themselves well to the goal of easy tool replacement. As shown in FIG. 4*a*, for example, segments of the outer gimbal portion can be hinged. Hinging can also be used for the inner gimbal portion.

The inner gimbal portion will have a tool grasping mechanism such as set screws or clamps. Any mechanism that adequately secures the tool in the inner gimbal portion is within the scope and spirit of the invention.

The inner and outer gimbal portion combination can pivot on a yoke such as part 4 in the figures. The shape of the yoke can vary from the U-shape shown in the diagrams, for example for particular types of tools or applications. The primary function of the yoke structure is to support the gimbal portions and provide a frame for an additional axis of rotation. In the illustrative figures, the inner gimbal portion has an axis of rotation with respect to the outer gimbal portion that is substantially perpendicular to the axis of rotation of the outer gimbal portion with respect to the yoke.

The yoke is preferably pivotally connected to a yoke support (such as part 44 in FIG. 1*b*). It is noted that the yoke support can be pivotally connected directly to the outer gimbal portion, thereby eliminating the U-shaped portion of the yoke structure. This removes the degree of freedom provided by the pivotal connection between the yoke and yoke support, however that degree of freedom can be created by additional pivoting components.

The yoke support can be pivotally attached to a support arm, such as articulated arm 8.

Turning back to FIG. 1*a*, support arm 8 and other articulated arms will be described in more detail. The lifting structure or arm attached to embodiments of the inventive gimbal assembly comprises for example, a double section parallelogram spring arm, with preferably reduced friction joints, including, starting at the proximal end: a hinge with one or more vertical pivots, a first parallelogram segment with four horizontal pivots, a central hinge with one or more vertical pivots, a distal parallelogram segment with four horizontal pivots and a distal vertical pivot. A single parallelogram arm may also be used. Various other hinges, pivots and fastening components may also be employed.

Various spring powered 'equipoising' parallelogram arms, such as those employed to support and position objects such as lamps, x-ray machines and dental equipment, can be employed in embodiments of the invention. These arms rely to a greater or lesser extent on friction to retain a selected angle or position, but do not necessarily provide consistent lift throughout the entire angular excursion of the parallelogram links. Arms having consistent lift can be particularly useful for many applications of embodiments of the invention. Arms that also may be appropriate include those described in applicant's U.S. Pat. No. 4,017,168 (Re. 32,213), the diagrams of which are incorporated herein by reference. Applicant's U.S. Pat. No. 5,360,196, diagrams of which are also incorporated herein by reference, provides examples of iso-elastic arms that will be particularly suitable for use in illustrative embodiments of the invention. "Iso-elastic" as used herein describes the consistent lifting performance of these arms in which the fixed weight of the object being lifted is supported throughout the vertical range of articulation with nearly constant buoyancy.

Arms described in applicant's application no. PCT/US2006/014036 or U.S. application Ser. No. 11/403,731, Equipoising Support Apparatus, incorporated herein by reference, are also suitable for use with illustrative embodiments of the invention. The applications describe a variety of single-spring geometries employing cams or cranks to dynamically improve lifting consistency and range of parallelogram articulation. The adjustment mechanisms described in the application can be employed in embodiments of the present invention, and can be user-adjusted.

It is noted that other tensioning mechanisms can be used in place of the springs referred to herein.

Hinges, such as those described in patent application PCT/US2008/056511, incorporated herein by reference, also are suitable for use with illustrative embodiments of the invention. Application PCT/US2008/056511 describes a 'biased hinge' that may further improve arm performance by helping to maintain the selected lateral position of the arm segments (which is termed 'centering').

Equipoising arms, such as those described in the patents/applications mentioned above can provide the desired iso-elasticity and lateral and vertical range. Features, such as knob-adjusted payload adjustment to float the range of human arm weights from the lightest to the heaviest, and analogous 'shoulder, upper arm, elbow and forearm' segments can be advantageous to illustrative embodiments of the invention.

A parking device can be incorporated, which may be either electrically or mechanically activated, to permit a tool to be parked in a convenient stable position when not in use. Such devices can include for example, mechanical docking components or magnetic or electromagnetic devices. In an illustrative embodiment of the invention, a hook and mating eye permits immobilizing the entire support arm at a convenient position and height by, for example, swinging over to that position and permitting the hook to rise into the receiving eye. The operator can then open the gimbal gate and remove the tool in order to exchange it with another tool or perform other work with the tool that may preclude or does not require gimbaled support.

Combinations and permutations of any of the features described herein or their equivalents are within the scope of the invention.

Embodiments of the invention also include a method of using a support and orienting apparatus. The method comprises: (1) securing a tool in an inner gimbal portion; (2) securing the inner gimbal portion to an outer gimbal portion, such that the inner gimbal portion rotates within the outer gimbal portion; and (3) attaching the inner and outer gimbal portion combination either directly or indirectly to an articulating arm. The method can further include using the tool to accomplish a task.

A further illustrative embodiment of the invention includes a plurality of tools, each secured in an inner gimbal portion, configured to be inserted into an outer gimbal portion that is a part of a pivoting and articulating support system. The invention further includes a system comprising the plurality of tools, each in an inner gimbal portion, an outer gimbal portion, the outer gimbal portion secured to a frame that can be pivotally attached to an articulated arm. The system can further include the arm.

Though the invention is described with reference to the particular embodiments of the invention herein set forth, it is understood that the present disclosure is made only by way of example and that numerous changes in the details of construction may be resorted to without departing from the spirit and scope of the invention. Accordingly, it is intended that the invention not be limited to the specific illustrative embodiments, but be interpreted within the full spirit and scope of the appended claims and their equivalents.

The invention claimed is:

1. A support and orienting system comprising:

an inner gimbal portion having a tool grasping device configured to grasp a tool and having a first rotation component;

an outer gimbal portion configured to be disposed concentrically with and outside of the inner gimbal portion and having a second rotation component complementary to the first rotation component and interfaced therewith such that the inner gimbal portion rotates within the outer gimbal about a first axis;

the outer gimbal connecter to a yoke structure, the yoke structure having a yoke rotatable with the outer gimbal about a second axis;

the yoke connected to a yoke support and rotatable there with about a third axis wherein the first axis, second axis and third axis are mutually perpendicular;

pivot mounting ears disposed on the outer gimbal portion to offset the pivotal attachment point of the outer gimbal on the yoke from the plane of the outer gimbal portion; and the pivot ears are adjustable to vary the offset amount.

2. The support and orienting apparatus of claim 1 wherein the inner gimbal portion is releasably secured to the outer gimbal portion to allow tool removal with the tool and inner gimbal portion attached to one another.

3. The support and orienting apparatus of claim 1 wherein the outer gimbal portion is releasably secured to the yoke structure to allow tool removal with the tool, inner gimbal portion and outer gimbal portion attached to each other.

4. The support and orienting apparatus of claim 1 wherein the inner gimbal portion comprises:

a tool holding ring comprised of a plurality of arcuate segments such that the ring can be assembled around the tool.

5. The support and orienting apparatus of claim 4 wherein the tool grasping mechanism comprises a plurality of set screws.

6. The support and orienting apparatus of claim 4 wherein the tool grasping mechanism comprises a plurality clamping screws.

7. The support and orienting apparatus of claim 1 wherein;

one of the first or second rotation components is a race in one of the outer surface of the inner gimbal portion or the inner surface of the outer gimbal portion; and the other of the first or second rotation component is a plurality of wheels rotatably mounted in the other of the inner gimbal portion or outer gimbal portion, the wheels disposed partially in the race;

wherein when the inner gimbal portion is disposed in the outer gimbal portion the plurality of wheels is disposed edgewise within the race, thus allowing the inner gimbal portion to rotate within the outer gimbal portion; and wherein wheel axes are substantially parallel to the axis of the tool portion about which the tool rotates with respect to the outer gimbal portion.

8. The support and orienting apparatus of claim 1 wherein:

the first rotation component is a race in the outer surface of the inner gimbal portion;

the second rotation component is a race in the inner surface of the outer gimbal portion;

both races are in substantially the same plane, and the apparatus further comprises:

at least one ball bearing notch disposed in and extending to the upper surface of the inner gimbal portion wherein the upper surface is referenced to the inner gimbal portion when disposed horizontally;

at least one ball bearing notch disposed in and extending to the upper surface of the Outer gimbal portion wherein the upper surface is teferenced to the puter gimbal portion when disposed horizontally;

wherein when the inner gimbal portion is disposed within the outer gimbal portion, and the notches in each are aligned with one another, they form a ball bearing insertion opening; and a plurality of ball bearings disposed within the races such that each ball bearing is partially disposed in both races, thus allowing the inner gimbal portion to rotate within the outer gimbal portion.

9. The support and orienting apparatus of claim 1 wherein the inner gimbal portion comprises a plurality of arcuate segments.

10. The support and orienting apparatus of claim 9 wherein the outer gimbal portion is hinged at the interface of at least two arcuate segments allowing one hinged segment to swing open from the other hinged segment thereby facilitating removal of the inner gimbal portion.

11. The support and orienting apparatus of claim 10 further comprising a quick-release clamp to secure the arcuate segments together at a point opposite the hinged interface.

12. The support and orienting apparatus of claim 10 further comprising a gate hinge extender.

13. The support and orienting apparatus of claim 1 further comprising:

an adjustable balancing component to adjust the center of mass of the tool.

* * * * *